United States Patent
Imazeki

(10) Patent No.: US 10,066,806 B2
(45) Date of Patent: Sep. 4, 2018

(54) LIGHT GUIDING BODY AND VEHICLE LIGHTING FIXTURE USING SAME

(71) Applicant: Stanley Electric Co., Ltd., Tokyo (JP)

(72) Inventor: Norifumi Imazeki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 60 days.

(21) Appl. No.: 15/225,285

(22) Filed: Aug. 1, 2016

(65) Prior Publication Data

US 2017/0038024 A1  Feb. 9, 2017

(30) Foreign Application Priority Data

Aug. 3, 2015 (JP) .................. 2015-153077

(51) Int. Cl.

| | |
|---|---|
| *F21V 9/00* | (2018.01) |
| *F21S 8/10* | (2006.01) |
| *G02B 17/00* | (2006.01) |
| *F21S 43/14* | (2018.01) |
| *F21S 43/239* | (2018.01) |
| *F21S 43/245* | (2018.01) |
| *F21S 43/249* | (2018.01) |

(52) U.S. Cl.
CPC .......... *F21S 48/2268* (2013.01); *F21S 43/14* (2018.01); *F21S 43/239* (2018.01); *F21S 43/245* (2018.01); *F21S 43/249* (2018.01); *G02B 17/006* (2013.01)

(58) Field of Classification Search
CPC .. F21S 48/215; F21S 48/2243; F21S 48/2268; F21S 48/2281; G02B 17/006

USPC .......................................................... 362/511
See application file for complete search history.

(56) References Cited

U.S. PATENT DOCUMENTS

| | | | | |
|---|---|---|---|---|
| 5,839,813 A * | 11/1998 | Smith | ...................... | B60Q 1/26 362/487 |
| 6,299,334 B1 * | 10/2001 | Schwanz | .............. | B60Q 1/2665 362/494 |
| 7,029,156 B2 * | 4/2006 | Suehiro | .................. | F21S 48/215 257/E33.072 |
| 7,073,933 B2 * | 7/2006 | Gotoh | .................. | G02B 6/0016 362/23.09 |
| 7,281,833 B2 * | 10/2007 | Akiyama | ............. | B60Q 1/2607 359/851 |

(Continued)

FOREIGN PATENT DOCUMENTS

JP      2008-97923 A      4/2008

*Primary Examiner* — Tsion Tumebo
(74) *Attorney, Agent, or Firm* — Kenealy Vaidya LLP

(57) ABSTRACT

A lighting fixture projects light sideward and has no restriction in design. The lighting fixture can include an LED; a primary lens disposed in an optical axis of the LED, the primary lens being configured to form a main light distribution; an auxiliary lens disposed on an outer peripheral side of the primary lens around the optical axis of the LED; and a reflecting portion configured to reflect part of light emitted from the LED to substantially an entire area of the auxiliary lens on an inner peripheral surface side thereof. The reflecting portion can be formed integrally with the primary lens and include an incident surface on which part of light emitted from the LED can be incident, a reflecting surface configured to reflect light having entered through the incident surface, and a light-exiting surface configured to allow the light reflected by the reflecting surface to exit.

17 Claims, 5 Drawing Sheets

(56) References Cited

U.S. PATENT DOCUMENTS

| | | | | |
|---|---|---|---|---|
| 9,703,032 | B2* | 7/2017 | Wu | G02B 6/0055 |
| 2003/0035298 | A1* | 2/2003 | Amano | B60Q 1/2607 |
| | | | | 362/518 |
| 2003/0043593 | A1* | 3/2003 | Amano | B60Q 1/2696 |
| | | | | 362/545 |
| 2003/0235046 | A1* | 12/2003 | Chinniah | F21S 48/1241 |
| | | | | 362/602 |
| 2006/0146573 | A1* | 7/2006 | Iwauchi | G02B 6/0018 |
| | | | | 362/621 |
| 2008/0232127 | A1* | 9/2008 | Futami | F21S 48/215 |
| | | | | 362/511 |
| 2008/0259620 | A1* | 10/2008 | Oba | F21S 48/2237 |
| | | | | 362/487 |
| 2009/0027911 | A1* | 1/2009 | Misawa | B60Q 1/0058 |
| | | | | 362/518 |
| 2010/0309677 | A1* | 12/2010 | Kazaoka | B60Q 1/2665 |
| | | | | 362/519 |
| 2014/0003075 | A1* | 1/2014 | Yamada | B60Q 1/0035 |
| | | | | 362/511 |
| 2014/0140084 | A1* | 5/2014 | Zwick | B60Q 1/26 |
| | | | | 362/511 |
| 2014/0376258 | A1* | 12/2014 | Wu | G02B 6/0055 |
| | | | | 362/607 |

* cited by examiner

LIGHT GUIDING BODY AND VEHICLE LIGHTING FIXTURE USING SAME

This application claims the priority benefit under 35 U.S.C. § 119 of Japanese Patent Application No. 2015-153077 filed on Aug. 3, 2015, which is hereby incorporated in its entirety by reference.

TECHNICAL FIELD

The presently disclosed subject matter relates to a light guiding body that can project light by reflecting light during guiding process of light emitted from a light source as well as a vehicle lighting fixture using the same.

BACKGROUND ART

Light emitting diodes (LEDs) having advantages, such as high light emission efficiency, high luminance, and electric power saving, have been widely utilized as light sources for vehicle lighting fixtures, such as turn signal lamps, rear lamps, stop lamps, etc. to be disposed on left and right sides of the rear portion of a vehicle body. Such an LED can emit light with strong directivity. Thus, in such a vehicle lighting fixture using the LED, the light with strong directivity is tried to be guided through a light guiding body so that the entire light guiding body can project light (the entire light guiding body can be illuminated with light). Specifically, such a light guiding body can project light (can be illuminated with light) by means of the following mechanism. That is, a light source can be disposed to face to the light guiding body with its incident surface opposed to the light source, and the light emitted from the light source can enter the light guiding body through the incident surface to an opposite side of the light guiding body to the incident surface side. Since the light guiding body can include a reflecting portion formed on a back surface, when the light having entered the light guiding body is guided (travels) through the light guiding body, part of the light can be totally reflected by the reflecting portion on the back surface to thereby be projected through a front surface of the light guiding body. In this manner, the light can be projected through the entire front surface of the light guiding body (the light guiding body can be entirely illuminated with the light through the front surface).

A conventional vehicle lighting fixture using a light guiding body will be described on the basis of FIGS. 1 and 2.

FIG. 1 is a front view of a conventional vehicle lighting fixture 101 and FIG. 2 is a cross-sectional view of the vehicle lighting fixture 101 taken along line B-B in FIG. 1. The illustrated vehicle lighting fixture 101 can be used as a turn signal lamp to be disposed on left and right sides of a vehicle body.

As illustrated in FIG. 2, the vehicle lighting fixture 101 to be used as a turn signal lamp can include a housing 102 having an opening and a transparent outer lens 103 configured to cover the opening of the housing 102 to define a lighting chamber 104. The vehicle lighting fixture 101 can further include a plurality of LEDs 105 (five LEDs in the illustrated example) as light sources, a light guiding body 106, an extension 107, etc., which are housed in the lighting chamber 104.

The vehicle lighting fixture 101 can further include an elongated substrate 108 which is disposed laterally (in a left-right direction in FIG. 1) at the upper portion within the lighting chamber 104 and on which the plurality of LEDs 105 are mounted at predetermined intervals so that the LEDs 105 can emit light downward.

The light guiding body 106 can be formed in a plate shape from a transparent resin such as an acrylic resin or a polycarbonate resin having light-guiding properties. The light guiding body 106 can include an incident surface 106a facing to the LEDs 105 at its upper surface and a light exiting surface 106b at its front surface. Furthermore, as illustrated in FIG. 2, the light guiding body 106 can be formed to be stepwisely thinned from a side of the incident surface 106a to its lower end side (an opposite side to the incident surface). In the illustrated example, there can be formed three reflecting portions 106c each having a reflecting surface at respective boundary portions of a rear surface of the light guiding body 106 where the thickness of the light guiding body 106 is stepwisely changed as illustrated in FIGS. 1 and 2. The reflecting portions 106c can be parallel with each other in the vertical direction while being curved obliquely rightward and upward in FIG. 1.

In the illustrated example, the housing 102 and the extension 107 can be integrally formed by an opaque resin that cannot transmit light so that the extension 107 can cover the LEDs 105, the substrate 108, and peripheries of the light guiding body 106.

In the vehicle lighting fixture 101 with the above-described configuration, when the plurality of LEDs 105 are supplied with a current to emit light, the light emitted downward from the LEDs 105 can enter the light guiding body 106 through the incident surface 106a of the light guiding body 106 as illustrated in FIG. 2. Then, as the light having entered the inside of the light guiding body 106 can travel (be guided) downward, part of the light can be totally reflected by the respective reflecting surfaces of the reflecting portions 106c formed in the rear surface of the light guiding body 106 to the front surface side (leftward in FIG. 2). Thus, the reflected light can be projected through the light exiting surface 106b and then through the transparent outer lens 103 forward, so that the three reflecting portions 106c of the light guiding body 106 can be observed as being illuminated with light in a curved manner when viewed from its front side.

Furthermore, Japanese Patent Application Laid-Open No. 2008-097923 proposes a vehicle lighting fixture using a light guiding body, which is illustrated in FIGS. 3 and 4.

FIG. 3 is a perspective view of the light guiding body 206 used in the vehicle lighting fixture proposed in Japanese Patent Application Laid-Open No. 2008-097923, and FIG. 4 is a front view illustrating an optical path within the light guiding body 206 of FIG. 3. The light guiding body 206 includes a first light guiding portion 206A, a light inverting portion 206B, a second light guiding portion 206C, and a light reflecting portion 206D.

Specifically, the first light guiding portion 206A can include an incident surface 206a at its longitudinal end to be opposed to a not-illustrated light source. The light inverting portion 206B is formed at an opposite longitudinal end of the first light guiding portion 206A and the second light guiding portion 206C. The light inverting portion 206B includes two inclined reflecting surfaces 206b and 206c so as to provide a function of inverting the traveling direction of parallel light rays guided from the first light guiding portion 206A.

The second light guiding portion 206C is thinned from the opposite longitudinal end side, and the light reflecting portion 206D is formed on the entire rear surface of the second light guiding portion 206C in the longitudinal direction by forming a plurality of triangular prism cuts disposed side by side in the longitudinal direction.

In the light guiding body 206 with the above-described configuration, when the not-illustrated light source is turned on to emit light, the light can enter the light guiding body 206 through the incident surface 206a of the first light guiding portion 206A to travel through the first light guiding portion 206A to the light inverting portion 206B. Then the light can be totally reflected by the reflecting surfaces 206b and 206c of the light inverting portion 206B to invert the traveling direction by 180°. The light travelling in the inverted direction through the second light guiding portion 206C can be reflected by the light reflecting portion 206D to be projected through the front surface (light exiting surface) of the second light guiding portion 206C. Thus, when observed from its front side, the light reflecting portion 206D can be observed as being illuminated with light.

Problems in association with such conventional techniques will now be discussed.

In the vehicle lighting fixture 101 illustrated in FIGS. 1 and 2, the light with strong directivity from the respective LEDs 105 as represented by L1 in FIG. 1 can travel downward through the light guiding body 106 while being diffused in a triangular front shape. Such light L1 directly reaching the respective reflecting portions 106c can be totally reflected by the respective reflecting portions 106c to be projected through the front light exiting surface 106b. In this case, the light L1 cannot reach the parts of the reflecting portions 106c of the light guiding body 106 closer to the LEDs 105, so that the reflected light rays can be separately projected and thus darkened portions may be generated (occurring uneven illuminance). Incidentally, it is difficult to dispose LEDs 105 on the opposite side (lower side in the drawings) from the viewpoint of general problems in association with processing vehicle bodies.

In the light guiding body 206 illustrated in FIGS. 3 and 4, since the light travelling through the first light guiding portion 206A is returned by the light inverting portion 206B (the travelling direction is inverted), the light guiding body 206 can project light as if the light source is disposed on the opposite side to the actual disposition side. However, the light can be projected only from the light reflecting portion 206D of the second light guiding portion 206C and the light guiding body 206 is thick by the thickness of the first light guiding portion 206A, resulting in enlarged size of the entire light guiding body 206. Specifically, as illustrated in FIG. 4, the light guiding body 206 has a thickness t being constant in the longitudinal direction while the light projecting portion or the second light guiding portion 206C has a half of the thickness t.

SUMMARY

The presently disclosed subject matter was devised in view of these and other problems and features in association with the conventional art. According to an aspect of the presently disclosed subject matter, a light guiding body can project light uniformly while achieving effective use of light from a light source without loss. Furthermore, there can be provided a vehicle lighting fixture using such a light guiding body.

According to another aspect of the presently disclosed subject matter, a light guiding body can include: an incident surface configured to face to a light source on one end side; an inverting portion provided on the other end side opposite to the incident surface, the light entering the light guiding body through the incident surface being guided through the light guiding body toward the inverting portion, the inverting portion configured to invert a travelling direction of light guided from the incident surface; and a rear surface and a front surface connecting the incident surface and the inverting portion, the rear surface having reflecting portions formed therein so that the reflecting portions can totally reflect the light toward the front surface, which serves as a light exiting surface. This light guiding body with this configuration can be formed to be stepwisely thickened from a side of the incident surface (the one end side) to a side of the inverting portion (the other end side), so that the rear surface can have the reflecting portions at respective boundary portions where a thickness of the light guiding body is stepwisely changed. The light emitted from the light source can enter the light guiding body through the incident surface and travel through the light guiding body to the inverting portion, and be returned to the side of the incident surface by the inverting portion, and part of the returned light can be reflected by each of the reflecting portions of the rear surface to be projected forward through the front surface.

In the light guiding body with this configuration, the inverting portion may be subjected to a light diffusion treatment.

In the light guiding body with any of the above-described configurations, the reflecting portions may be subjected to light diffusion treatment.

According to still another aspect of the presently disclosed subject matter, a vehicle lighting fixture can include a housing having an opening; an outer lens configured to cover the opening of the housing to define a light chamber together with the housing; and a light source and the light guiding body with any of the above-described configurations, which can be housed in the lighting chamber.

In the vehicle lighting fixture with this configuration, an inner surface of the housing opposed to the light guiding body may be subjected to reflection treatment.

In the light guiding body with the main configuration as described above, the light can enter the light guiding body through the incident surface and straightforwardly travel within the light guiding body to reach the inverting portion. Then, the traveling direction of the light can be inverted by the inverting portion so that the light can travel through the light guiding body from the inverting portion toward the incident surface in the inverted travelling direction. During this inverted travelling, part of the light can be totally reflected by each of the reflecting portions provided at the respective boundary portions where the thickness of the light guiding body changes. In this manner, the light can be projected from the reflecting portions forward. In the light guiding body, since the light returned by the inverting portion can be still diffused while travelling in the inverted traveling direction, the substantially entire area of each of the reflecting portions can receive the returned light to totally reflect the light. This is because the light from the light source to the reflecting portions can travel through sufficiently long traveling paths and thus the light can be sufficiently diffused. This can prevent darkened portions from being generated while providing uniform light emission from the entire reflecting portions. Furthermore, since the stepwise thickening of the light guiding body is achieved from the side of the incident surface toward the inverting portion, the leakage of light to the outside of the light guiding body can be prevented. Furthermore, the stepwise thinning of the light guiding body in the inverted travelling direction of light can ensure the light to impinge on the plurality of reflecting surfaces stepwisely.

Furthermore, the light guiding body with the inverting portion subjected to the light diffusion treatment can promote the diffusion of light toward the reflecting portions in the inverted travelling direction. This can enhance the uniform light emission from the reflecting portions, and also effectively prevent the occurrence of the darkened portion.

The light guiding body with the reflecting portions subjected to the light diffusion treatment can achieve the uniform light emission from the reflecting portions and effectively prevent the occurrence of the darkened portion.

The vehicle lighting fixture with the above-described configuration can emit light uniformly and improve the appearance of the entire lighting fixture during light emission.

In the vehicle lighting fixture with the housing inner surface being subjected to the reflection treatment, even when the light is leaked through the rear surface of the light guiding body, the light can be reflected by the reflection treated inner surface of the housing opposed to the light guiding body and enter the light guiding body again. This re-entering light can be used for light emission from the light guiding body, resulting in enhanced light utilization efficiency.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to light guiding bodies and vehicle lighting fixtures of the presently disclosed subject matter with reference to the accompanying drawings in accordance with exemplary embodiments. Herein, the directions shall be based on the posture of the vehicle lighting fixture mounted on a vehicle lighting body with the light emitting direction being forward.

Figure 1:
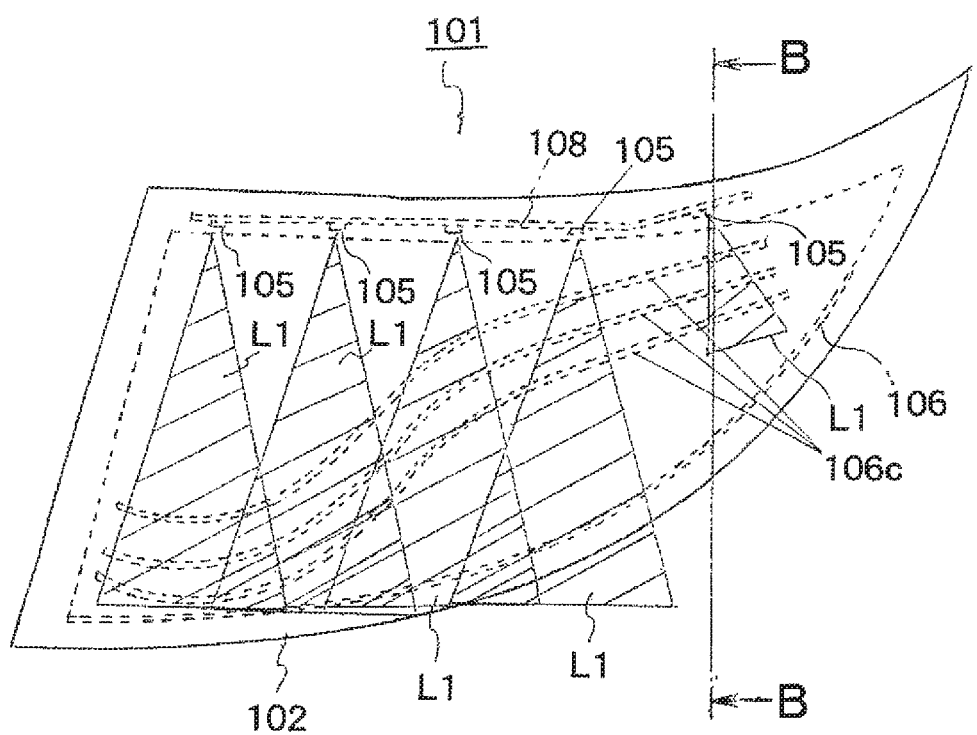
FIG. 1 is a front view of a conventional vehicle lighting fixture.
Figure 2:
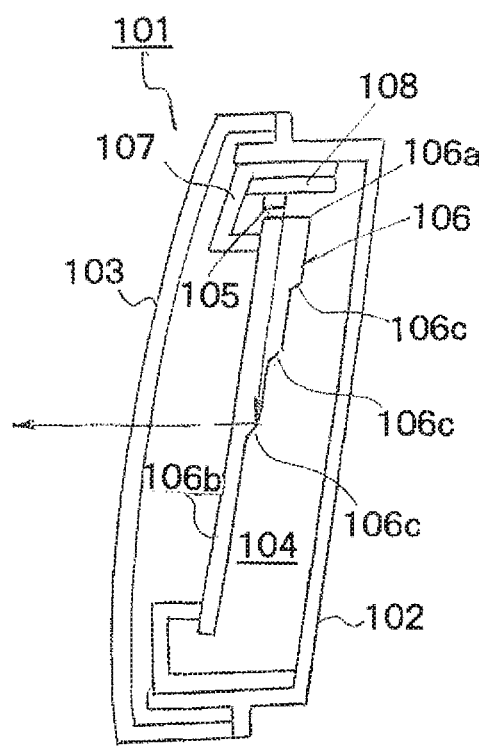
FIG. 2 is a cross-sectional view of FIG. 1 taken along line B-B.
Figure 3:
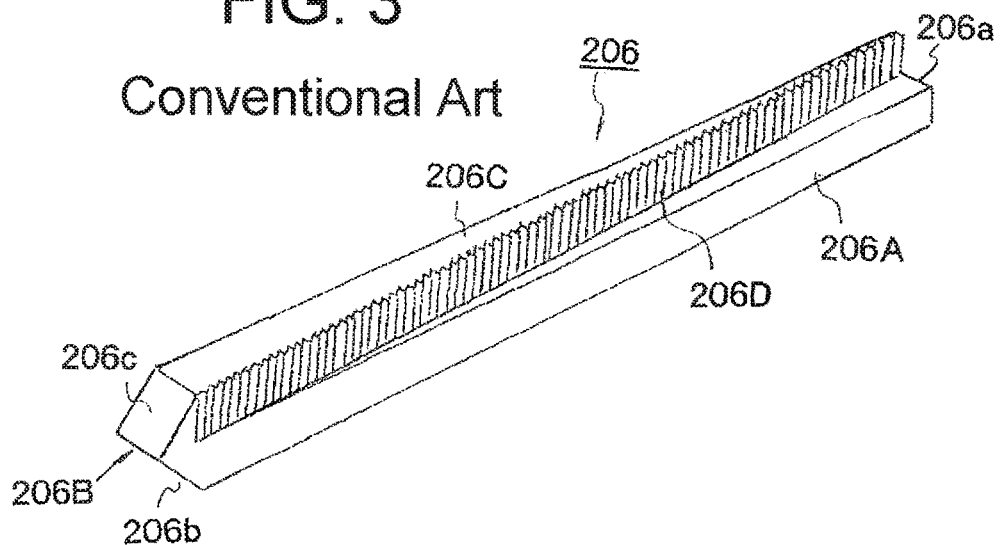
FIG. 3 is a perspective view of a light guiding body to be used in a vehicle lighting fixture proposed in Japanese Patent Application Laid-Open No. 2008-097923.
Figure 4:
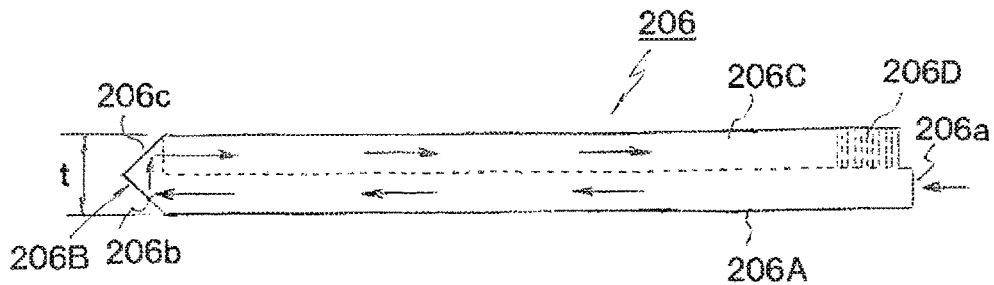
FIG. 4 is a front view illustrating travelling paths of light within the light guiding body of FIG. 3.
Figure 5:
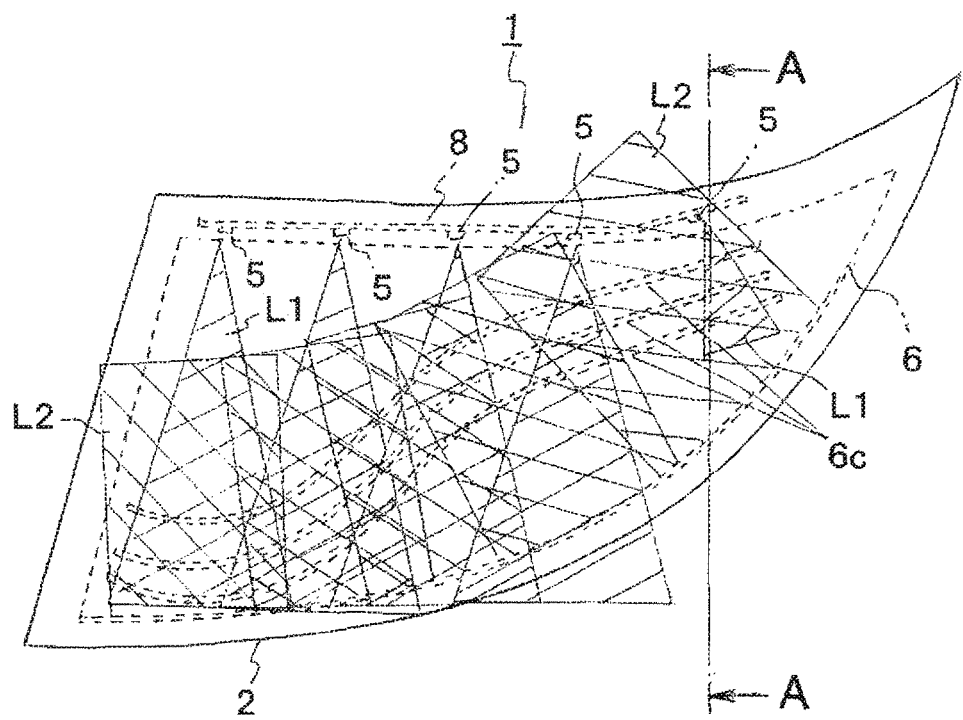
FIG. 5 is a front view of a vehicle lighting fixture made in accordance with principles of the presently disclosed subject matter.
Figure 6:
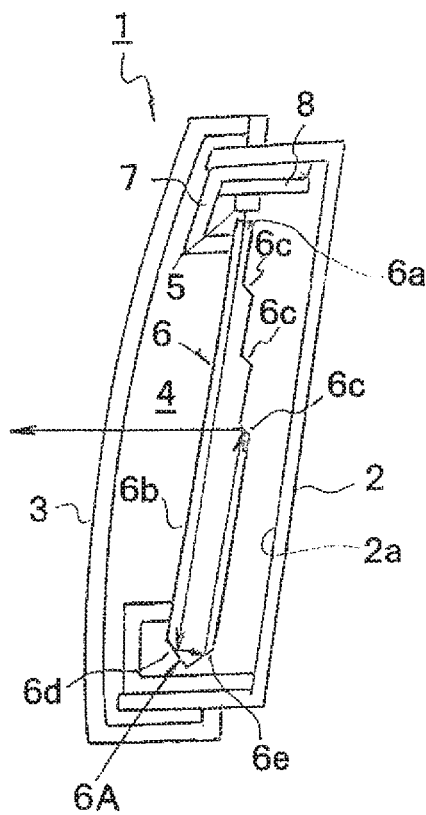
FIG. 6 is a cross-sectional view of the vehicle lighting fixture of FIG. 5 taken along line A-A.

FIG. 5 is a front view of a vehicle lighting fixture 1 made in accordance with the principles of the presently disclosed subject matter, and FIG. 6 is a cross-sectional view of the vehicle lighting fixture 1 of FIG. 5 taken along line A-A. The illustrated vehicle lighting fixture 1 can be used as a turn signal lamp to be disposed on right and left side of a vehicle body. Because the basic structure is common to both right and left turn signal lamps, one vehicle lighting fixture 1 will be described.

As illustrated in FIG. 5, the vehicle lighting fixture 1 to be used as a turn signal lamp can include a housing 2 having an opening and a transparent outer lens 3 configured to cover the opening of the housing 2 to define a lighting chamber 4. The vehicle lighting fixture 1 can further include a plurality of LEDs 5 (five LEDs in the illustrated example) as light sources, a light guiding body 6 (also being one aspect of the presently disclosed subject matter), an extension 7, etc., which can be housed in the lighting chamber 4.

The vehicle lighting fixture 1 can further include an elongated substrate 8 which can be disposed laterally (in a left-right direction in FIG. 5) at the upper portion within the lighting chamber 4 and on which the plurality of LEDs 5 are mounted at predetermined intervals so that the LEDs 5 can emit light downward, as illustrated in FIG. 5.

The light guiding body 6 made in accordance with the principles of the presently disclosed subject matter can be formed in a plate shape from a transparent resin such as an acrylic resin or a polycarbonate resin having light-guiding properties. The light guiding body 6 can include an incident surface 6a facing to the LEDs 5 at its upper surface and a light exiting surface 6b at its front surface. Furthermore, as illustrated in FIG. 6, the light guiding body 6 can be formed to be stepwisely thickened from a side of the incident surface 6a to its lower end side (an opposite side to the incident surface 6a). In the illustrated example, there can be formed three reflecting portions 6c each having a reflecting surface at respective boundary portions of a rear surface of the light guiding body 6 where the thickness of the light guiding body 6 is stepwisely changed as illustrated in FIGS. 5 and 6. The reflecting portions 6c can be parallel with each other in the vertical direction while being curved obliquely rightward and upward in FIG. 5. Each of the reflecting surfaces of the reflecting portions 6c can be a totally reflecting surface that can totally reflect light.

Figure 7:
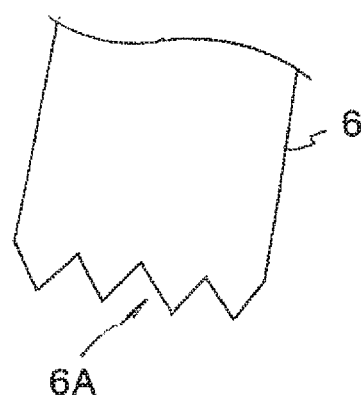
FIG. 7 is a cross-sectional view of part of an inverting portion of a light guiding body in another exemplary embodiment made in accordance with the principles of the presently disclosed subject matter.

Furthermore, the light guiding body 6 can include an inverting portion 6A at an opposite end to the incident surface 6a where the thickness is the thickest (at the lower end portion in the drawings). The light inverting portion 6A includes two inclined reflecting surfaces 6d and 6e so as to provide a function of inverting the traveling direction of parallel light rays guided through the light guiding body 6 (function of returning the light in an inverted travelling direction). In the illustrated exemplary embodiment, the inverting portion 6A can take a triangular prism shape, but is not limited to this. As illustrated in FIG. 7, the inverting portion 6A may be constituted by a plurality of small triangular prisms configured to return the light in the inverted travelling direction.

Furthermore, the housing 2 and the extension 7 can be integrally formed by an opaque resin that cannot transmit light so that the extension 7 can cover the LEDs 5, the substrate 8, and peripheries of the light guiding body 6.

In the illustrated exemplary embodiment, the inverting portion 6A and the reflecting portions 6c can be subjected to light diffusion treatment such as formation of cuts or surface texturing. Furthermore, the housing 2 can have an inner surface 2a opposed to the rear surface of the light guiding body 6, with the inner surface 2a being subjected to reflection treatment such as aluminum deposition.

In the vehicle lighting fixture 1 with the above-described configuration, when the plurality of LEDs 5 are supplied with a current to emit light downward, the light with strong directivity from the respective LEDs 5 can enter the light guiding body 6 through the incident surface 6a thereof. Then, the light having entered the light guiding body 6 can travel downward to the inverting portion 6A while being diffused in a triangular front shape as represented by L1 in FIG. 5. Then the light L1 can be totally reflected by the reflecting surfaces 6d and 6e of the inverting portion 6A to invert the traveling direction by 180°. The light still diffused in a triangular front shape can travel upward in the inverted direction as represented by L2 in FIG. 5. During travelling, part of the light can be totally reflected by the respective reflecting surfaces of the reflecting portions 6c formed in the rear surface of the light guiding body 6 to the front surface side (leftward in FIG. 6). Thus, the reflected light can be projected through the light exiting surface 6b and then through the transparent outer lens 3 forward, so that the three reflecting portions 6c of the light guiding body 6 can be observed as being illuminated with light in a curved manner when viewed from its front side.

In this exemplary embodiment, the light L1 can enter the light guiding body 6 through the incident surface 6a and straightforwardly travel within the light guiding body 6 downward to reach the inverting portion 6A. Then, the traveling direction of the light L1 can be inverted by the inverting portion 6A so that the light L2 can travel through the light guiding body 6 from the inverting portion 6A toward the incident surface 6a in the inverted travelling direction (upward). During this inverted travelling, part of the light L2 can be totally reflected by each of the reflecting portions 6c provided at the respective boundary portions where the thickness of the light guiding body 6 changes. In this manner, the light L2 can be projected from the reflecting portions 6c forward. In the light guiding body 6, since the light L2 returned by the inverting portion 6A can be still diffused while travelling in the inverted traveling direction (upward), the substantially entire area of each of the reflecting portions 6c can receive the returned light to totally reflect the light. This is because the light from the LEDs 5 to the reflecting portions 6c of the light guiding body 6 can travel through sufficiently long traveling paths and thus the light can be sufficiently diffused. This can prevent darkened portions from being generated while providing uniform light emission from the entire reflecting portions 6c. Accordingly, the vehicle lighting fixture 1 to be used as a turn signal lamp can emit light uniformly and improve the appearance of the entire vehicle lighting fixture 1 during light emission. Furthermore, since the stepwise thickening of the light guiding body 6 is achieved from the side of the incident surface 6a toward the inverting portion 6A, the leakage of light to the outside of the light guiding body 6 can be prevented. Furthermore, the stepwise thinning of the light guiding body in the inverted travelling direction of light can ensure the light to impinge on the plurality of reflecting surfaces stepwisely.

Furthermore, the light guiding body 6 according to this exemplary embodiment with the inverting portion 6A subjected to the light diffusion treatment can promote the diffusion of light L2 toward the reflecting portions 6c in the inverted travelling direction. This can enhance the uniform light emission from the reflecting portions 6c, and also effectively prevent the occurrence of the darkened portion.

The light guiding body 6 with the reflecting portions 6c subjected to the light diffusion treatment can achieve the uniform light emission from the reflecting portions 6c and effectively prevent the occurrence of the darkened portion.

In the vehicle lighting fixture 1 with the inner surface 2a of the housing 2 being subjected to the reflection treatment such as aluminum deposition, even when the light is leaked through the rear surface of the light guiding body 6, the light can be reflected by the reflection treated inner surface 2a of the housing 2 opposed to the light guiding body 6 and enter the light guiding body 6 again. This re-entering light can be used for light emission from the light guiding body 6, resulting in enhanced light utilization efficiency.

Note that the vehicle lighting fixture made in accordance with the principles of the presently disclosed subject matter can be used not only as a turn signal lamp, but also any other vehicle lighting fixtures, such as rear lamps, stop lamps, reverse lamps, positioning lamps, etc. Furthermore, the light source used in the vehicle lighting fixture of the presently disclosed subject matter is not limited to LEDs, but may be bulbs and the like light sources.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting fixture comprising:
a housing having an opening;
an outer lens configured to cover the opening of the housing to define a light chamber together with the housing; and
a light source and a light guiding body, which are housed in the lighting chamber, wherein
the light guiding body comprises:
    an incident surface configured to face to the light source on one end side;
    an inverting portion provided on the other end side opposite to the incident surface, the light entering the light guiding body through the incident surface being guided through the light guiding body toward the inverting portion, the inverting portion configured to invert a travelling direction of light guided from the incident surface; and
    a rear surface and a front surface facing to the outer lens and opposite to the rear surface, the rear surface and the front surface connecting the incident surface and the inverting portion, the rear surface having reflecting portions formed therein so that the reflecting portions totally reflect the light toward the front surface, which serves as a light exiting surface,
wherein the light guiding body is formed to be stepwisely thickened from a side of the incident surface to a side of the inverting portion, so that the rear surface has the reflecting portions at respective boundary portions where a thickness of the light guiding body is stepwisely changed,
wherein the light guiding body has a thickness between the front surface and the rear surface on the one end side closer to the incident surface smaller than that on the other end side closer to the inverting portion,
wherein the inverting portion has a triangular prism shape including a first reflecting surface on a side of the front surface and a second reflecting surface on a side of the rear surface, and
wherein the light emitted from the light source enters the light guiding body through the incident surface and travels through the light guiding body to the first reflecting surface of the inverting portion, and is reflected by the first reflecting surface to the second reflecting surface and in turn by the second reflecting surface toward the rear surface to be returned to the side of the incident surface by the inverting portion, and part of the returned light toward the rear surface is reflected by each of the reflecting portions of the rear surface to be projected forward through the front surface.

2. The vehicle lighting fixture according to claim 1, wherein the inverting portion is subjected to a light diffusion treatment.

3. The vehicle lighting fixture according to claim 1, wherein the reflecting portions are subjected to light diffusion treatment.

4. The vehicle lighting fixture according to claim 2, wherein the reflecting portions are subjected to light diffusion treatment.

5. The vehicle lighting fixture according to claim 1, wherein an inner surface of the housing opposed to the light guiding body is subjected to reflection treatment.

6. The vehicle lighting fixture according to claim 2, wherein an inner surface of the housing opposed to the light guiding body is subjected to reflection treatment.

7. The vehicle lighting fixture according to claim 3, wherein an inner surface of the housing opposed to the light guiding body is subjected to reflection treatment.

8. The vehicle lighting fixture according to claim 4, wherein an inner surface of the housing opposed to the light guiding body is subjected to reflection treatment.

9. The vehicle lighting fixture according to claim 1, wherein the front surface has a straight line shape in a cross section along a direction connecting the incident surface and the first reflecting surface of the inverting portion so that the light having entered the light guiding body through the incident surface travels in a straightforward manner to the first reflecting surface of the inverting portion.

10. The vehicle lighting fixture according to claim 2, wherein the front surface has a straight line shape in a cross section along a direction connecting the incident surface and the first reflecting surface of the inverting portion so that the light having entered the light guiding body through the incident surface travels in a straightforward manner to the first reflecting surface of the inverting portion.

11. The vehicle lighting fixture according to claim 3, wherein the front surface has a straight line shape in a cross section along a direction connecting the incident surface and the first reflecting surface of the inverting portion so that the light having entered the light guiding body through the incident surface in a straightforward manner to the first reflecting surface of the inverting portion.

12. The vehicle lighting fixture according to claim 4, wherein the front surface has a straight line shape in a cross section along a direction connecting the incident surface and the first reflecting surface of the inverting portion so that the light having entered the light guiding body through the incident surface in a straightforward manner to the first reflecting surface of the inverting portion.

13. The vehicle lighting fixture according to claim 1, wherein the reflecting portions of the rear surface of the light guiding body are curved at least partly when viewed from a side of the outer lens.

14. The vehicle lighting fixture according to claim 2, wherein the reflecting portions of the rear surface of the light guiding body are curved at least partly when viewed from a side of the outer lens.

15. The vehicle lighting fixture according to claim 3, wherein the reflecting portions of the rear surface of the light guiding body are curved at least partly when viewed from a side of the outer lens.

16. The vehicle lighting fixture according to claim 4, wherein the reflecting portions of the rear surface of the light guiding body are curved at least partly when viewed from a side of the outer lens.

17. The vehicle lighting fixture according to claim 9, wherein the reflecting portions of the rear surface of the light guiding body are curved at least partly when viewed from a side of the outer lens.

* * * * *